(12) United States Patent
Rilly et al.

(10) Patent No.: US 6,768,520 B1
(45) Date of Patent: Jul. 27, 2004

(54) METHOD FOR REGULATING THE PICTURE POWER IN A TELEVISION RECEIVER

(75) Inventors: Gérard Rilly, Unterkirnach (DE); Hossein Ahmari, Villingen-Schwenningen (DE); Hans Guenter Bicheler, Villingen-Schwenningen (DE); Stefan Kimmelmann, Bad Duerrheim (DE)

(73) Assignee: Thomson Licensing S.A., Boulogne (FR)

( * ) Notice: Subject to any disclaimer, the term of this patent is extended or adjusted under 35 U.S.C. 154(b) by 0 days.

(21) Appl. No.: 09/529,922

(22) PCT Filed: Oct. 16, 1998

(86) PCT No.: PCT/EP98/06582

§ 371 (c)(1),
(2), (4) Date: Apr. 20, 2000

(87) PCT Pub. No.: WO99/21357

PCT Pub. Date: Apr. 29, 1999

(30) Foreign Application Priority Data

Oct. 20, 1997 (EP) ............................................. 97118153
Apr. 24, 1998 (DE) ........................................ 198 18 387

(51) Int. Cl.[7] .............................................. H04N 5/63
(52) U.S. Cl. ...................... 348/730; 348/739; 345/60
(58) Field of Search ................................ 348/678, 682, 348/380, 730, 687, 805, 797, 765, 766, 739; 345/60, 211, 212; H04N 5/63, 5/52

(56) References Cited

U.S. PATENT DOCUMENTS

| | | | | |
|---|---|---|---|---|
| 4,587,554 A | * | 5/1986 | Tamura et al. ............... | 348/380 |
| 4,996,590 A | * | 2/1991 | Okamoto et al. ............ | 348/678 |
| 5,245,434 A | * | 9/1993 | Gurley ......................... | 348/678 |
| 5,313,294 A | * | 5/1994 | Haferl .......................... | 348/377 |
| 5,349,390 A | * | 9/1994 | Stessen et al. ............... | 348/679 |
| 6,483,557 B1 | * | 11/2002 | Allender et al. ............. | 348/805 |

FOREIGN PATENT DOCUMENTS

| | | | |
|---|---|---|---|
| EP | 0354518 | 8/1988 | ............ H04N/5/57 |
| EP | 0394003 | 10/1990 | ............ H04N/5/14 |
| EP | 0574711 A1 | 12/1993 | ............ H04N/5/57 |

OTHER PUBLICATIONS

European Search Report.

* cited by examiner

*Primary Examiner*—Michael H. Lee
*Assistant Examiner*—Trang U. Tran
(74) *Attorney, Agent, or Firm*—Joseph S. Tripoli; Harvey D. Fried; Franceis A. Davenport

(57) ABSTRACT

In computer monitors having a picture tube, it may be seen that a small white picture area is displayed with the same white value as a large white picture area. If it were intended to achieve the same result for a television receiver with a picture tube, a voltage supply is necessary in which the power is permitted to fluctuate between 60 and 300 watts given a stable output voltage.

On account of the lower luminous efficiency, this effect would have considerably intensified repercussions on the power consumption of plasma screens.

The invention is based on the object of providing a simplified method for regulating the picture power in a television receiver.

The method according to the invention is distinguished by the following steps. The power consumption of the picture power is obtained by the video voltage R, G, B. The video voltage is converted into an information item which is then a measure of the picture power. This information item is subsequently fed to two regulating loops. In the fast loop, the value of the picture power in a short period of time is averaged. The fast loop, that is to say the fast regulation, ensures fast falling of the amplitude of the picture power for the case where a large number of lines are displayed completely white. This serves to ensure that the power consumption, which is defined beforehand, is not exceeded.

15 Claims, 14 Drawing Sheets

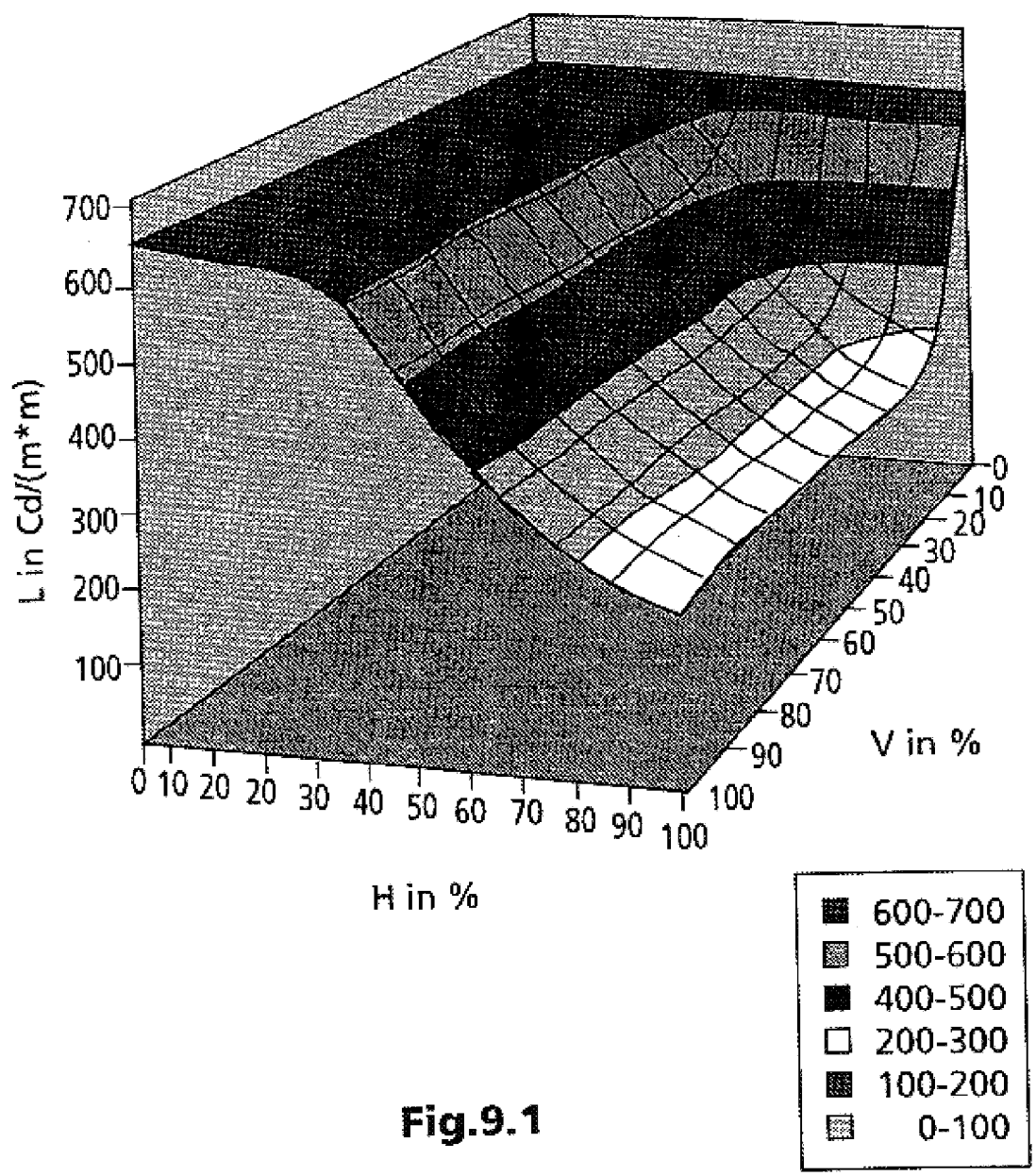
Fig. 9.1

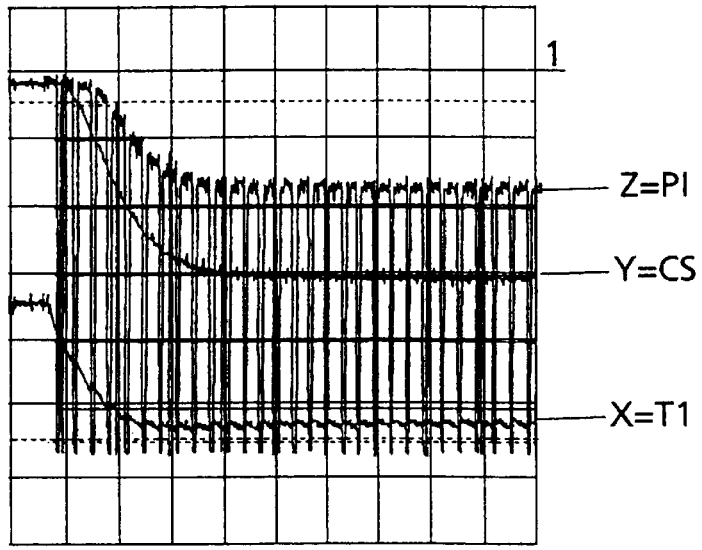
Fig.9.2
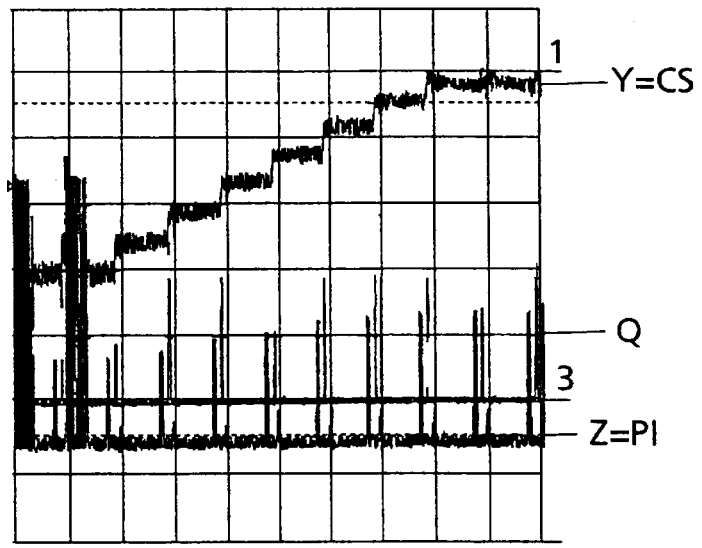
Fig.9.3

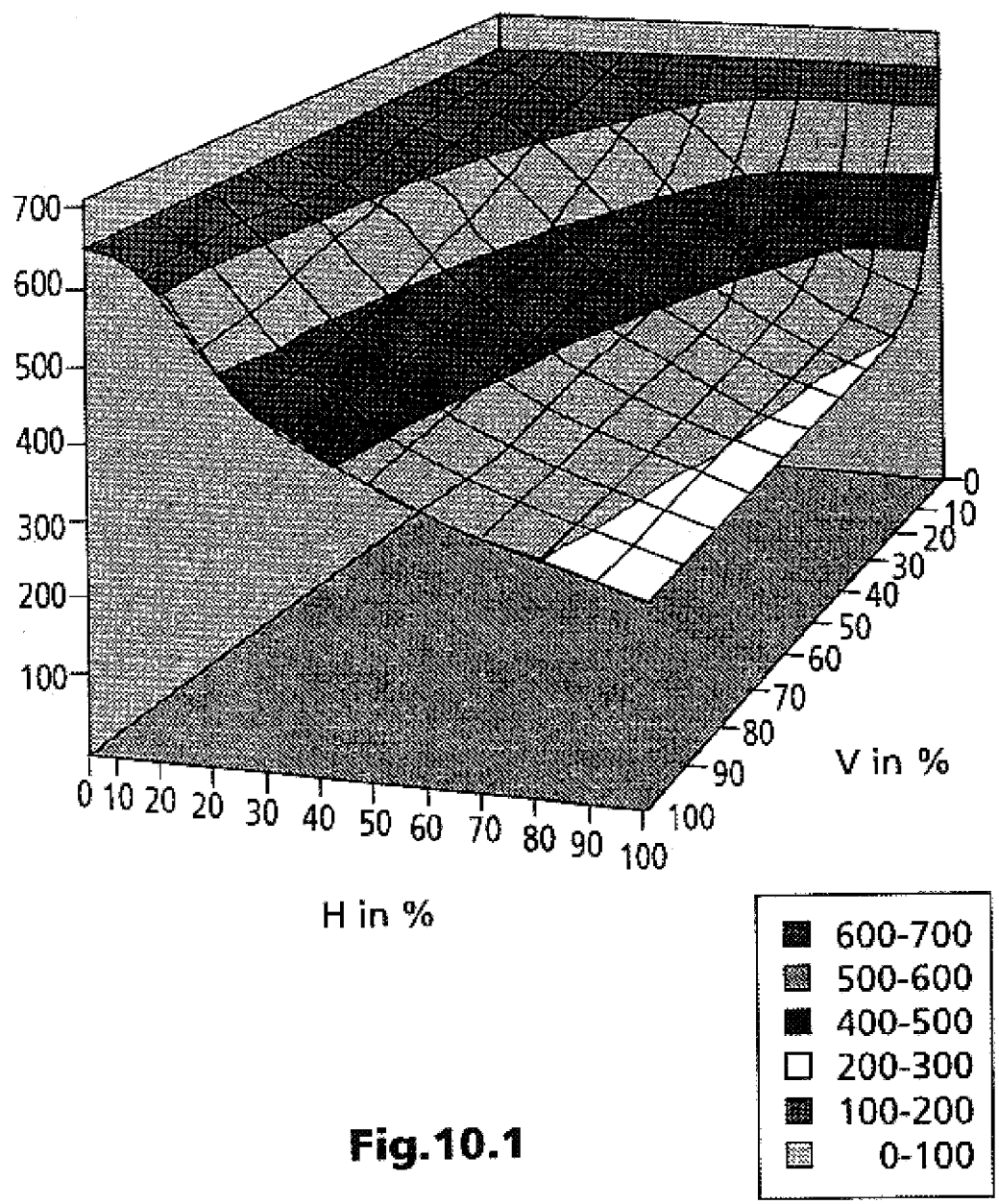
Fig.10.1

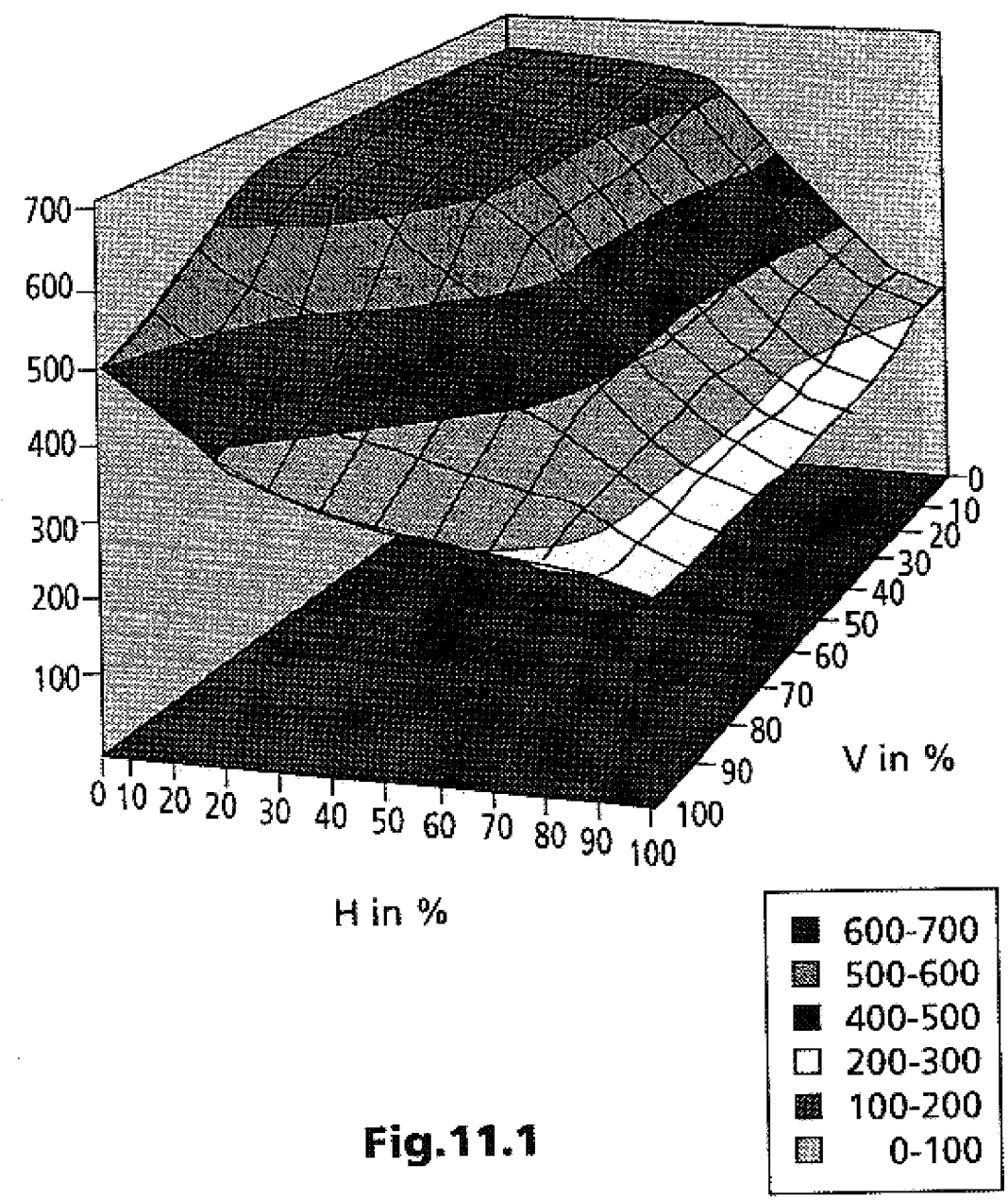
Fig.11.1

METHOD FOR REGULATING THE PICTURE POWER IN A TELEVISION RECEIVER

The invention is based on a method for regulating the picture power in a television receiver.

BACKGROUND OF THE INVENTION

In computer monitors having a picture tube, it may be seen that a small white picture area is displayed with the same white value as a large white picture area. If it were intended to achieve the same result for a television receiver with a picture tube, a voltage supply is necessary in which the power is permitted to fluctuate between 60 and 300 watts given a stable output voltage.

For televisions with picture tubes there is a solution in that the average value of the beam current is measured. The larger this average value is, the more the contrast and the brightness of the picture are reduced. If separately regulated high-voltage generators are used, this regulating principle can no longer be used satisfactorily.

In television receivers with plasma screens, on account of the lower luminous efficiency, this effect would have considerably more severe repercussions on the power consumption. In addition, the known solutions cannot be transferred to television receivers with plasma screens.

SUMMARY OF THE INVENTION

The invention is based on the object of providing a simplified method for regulating the picture power in a television receiver. This object is achieved by means of the features of the invention which are specified in the claims. Advantageous developments of the invention are specified in the subclaims.

The inventive method for regulating the picture power in a television receiver having a video processor which has a control input which receives an input signal and which emits an output signal, having a converter circuit, having a control unit and having a comparator circuit, is characterized in that the converter circuit monitors the output signal of the video processor and converts it into a picture power signal, in that the picture power signal is fed to the comparator circuit via the control unit, in that the comparator circuit performs a comparison with a predetermined desired value, and, in the event of deviations from the desired value the picture power is changed by way of the control input.

It is advantageous in this case that the power consumption of the picture power is obtained using the video voltages R, G, B. The video voltages are converted into an information item which is then a measure of the picture power. This information item is preferably a voltage value. This information item is subsequently fed to two regulating loops. In the fast loop, as dynamic regulation, the value of the picture power is determined during a short time period, for example one millisecond. The fast loop, that is to say the fast regulation, ensures fast falling of the amplitude of the picture power for the case where a large number of lines are displayed completely white. This serves to ensure that the maximum power consumption, which is defined beforehand, is not exceeded.

In the slow loop, as static regulation, the picture power is determined during a relatively long time period, for example a few milliseconds. The slow loop does not react to the dynamic range of the picture as such, but rather is intended to control the total white value and thus the total picture power of the pictures to be displayed. In other words the fast loop is for dynamic, horizontal rate regulation and the slow loop is for static, vertical rate regulation. It is possible additionally to use a further slower loop in order to form protection for the electronic components against overtemperature and/or ageing effects. On account of these loops, the regulating principle according to the invention permits a high dynamic range of the picture and reduces the outlays which would otherwise be necessary in order to provide a voltage supply with similar criteria.

A desired value is predetermined for the picture power in the circuit for the regulation. This desired value can be set by the manufacturer and/or by the user, there being a maximum value which is not supposed to be exceeded.

In the simplest case, the solution of the invention is such that only the fast loop is used, which loop can also be referred to as control unit.

One advantage of the solution according to the invention is the fact that the picture power and thus the peak luminance value can be reduced during a field. A reduction can be performed to an extent such that the critical region for the maximum power consumption is not reached. That is to say that if the fast loop detects that the picture power rises excessively greatly or assumes an excessively high value during a plurality of lines, a regulating signal passes from this fast loop via a comparator to the contrast control input of the video processor, which then reduces the video voltage R, G, B, thereby rapidly decreasing the picture power.

If the slow loop detects that the picture power is too high during a plurality of fields, the regulation is effected, as in the case of the fast loop, via a linear comparator, which then forwards a signal to the contrast control input of the video processor where, once again, the video voltage R, G, B is decreased, with the result that the picture power slowly decreases.

The instances of regulation can also be used to enable the picture powers to be increased. If, for example, only a small picture excerpt is displayed white, then the maximum white value of this picture can be set by the instances of regulation in that the picture power is only reduced when a relatively large picture excerpt is displayed. The user consequently sees a picture having the maximum white value, since it is now possible to permit the maximum picture power for this small area of the small picture excerpt. The new solution has the advantage that a better dynamic range of the picture and no overloading of the voltage-supplying circuits are ensured.

The following considerations may be summarized once again at this point: on the one hand, the regulating loop must be stable enough and must not change significantly when the picture contents are the same. On the other hand, the present status and the alteration of the contrast and of the power consumption must not be visible on the screen. For this reason, a maximum deviation of the peak white value of 10% during a frame is designed in order to obtain an acceptable delimitation of the value. During a change from a full-black to a full-white picture, it is not necessary to keep to this rule. In this case, it is possible to reduce the peak white value by factors of 2 to 4. However, this should apply in each case only to the first picture, in order that the viewer does not notice it. The maximal 10% increase in the peak white value should be maintained for the subsequent fields. The system then monitors whether the picture has the same content. In this case, it is necessary to correct the 10% increase for each field. If the picture becomes darker, the 10% increase field by field again leads to the maximum picture power consumption.

In order to acquire a simple solution for the stability criteria, the following solution has been worked out. During the frame flyback, the level of the picture power can rise slightly if the picture remains the same and if the picture power is reduced during the subsequent field. However, if the picture becomes less bright, that is to say that the picture power slowly rises, then the peak white value can slowly be decreased from field to field. This fast increasing by a maximum of 10% during a field is not visible since the increasing from field to field takes place when no picture is being displayed. If the extreme case is assumed, that is to say a full-black to a full-white picture, an increase can then be effected in 10% steps during the transition from a white to a black picture.

The number of grey-scale values in plasma is limited by the use of 8 bits on 256 level steps. The level steps are to be equated with the grey-scale values. In a plasma display, the video luminance is given by the video code which corresponds to the number of plasma cell discharges per field. This number of discharges is divided between a plurality of subfields, which results in a predetermined number of pulses (4, 8, 16, . . . ). A specific way of controlling power consumption is required in order to obtain a multiplication of the number of pulses in each subfield by a parameter k. The value k corresponds to the peak white value which is set during a field and is intended to remain constant. The maximum of the peak white value is to be assumed for k=1. Depending on the different plasma screen manufacturers, k minimum may be ½ or ¼. The factor k is controlled by a power control input at the plasma display module PD. The brightness of the plasma display module therefore drives a power control input. For this reason, use is made of the conversion unit, also called interface, which enables regulation of peak white values. The regulation is thus effected via the input of the contrast control in the video processor and, on the other hand, by a power control input of the plasma display module. A fast reduction is carried out in the video processor during a field in particularly critical changes between black and white. During the vertical flyback, the power control. input of the plasma display module can then react to the next field and to the picture power. The desired value is then defined anew, via the conversion unit, with regard to the factor k which was selected. If the power control input is not used, the circuit operates with the regulating stages.

As an example: if a critical picture change is present, a black picture being followed by a full-white picture, then the fast regulation reacts immediately and ensures that, with the aid of the comparator, the current is drawn from the capacitor connected thereto. As a result, the voltage across the capacitor decreases and the video information and thus the picture power are immediately reduced by way of the contrast control input. During the next field, the picture power is reduced by way of the power control input. Therefore, it is now no longer necessary for the regulation according to the invention to decrease the picture power. For this reason, the conversion unit increases the desired value and charges the capacitor with a current source to the maximum value. During a following black picture, the picture power is increased field by field by way of the elevation of the K value and the resultant power control value.

Depending on various criteria of the power consumption and by evaluation of the incoming fields, it is possible to reduce the peak white value down to the values predetermined by components. This means that the maximum must not be exceeded and if the same display effect can be achieved with a minimum of powers, this is attempted. The peak white values are increased slightly during the flyback time. This increase in small steps is necessary in order that it is not conspicuous to a user.

Three cases will be considered for the following picture transitions.

Case 1: The picture remains the same. The maximum white value settings are maintained during the field transitions.

Case 2: The picture becomes brighter. The white settings are rapidly reduced in the field.

Case 3: The picture becomes less bright. The maximum white value settings are increased slightly during the field transitions and the maximum white value is set to the predetermined value during each field.

The method for regulating the picture power in a television receiver is distinguished by the following steps: the picture power signal is filtered using a low-pass filter having a plurality of time constants. The first low-pass filter has a small time constant which enables a number of white lines to be detected. The second time constant leads to an average value which provides a statement regarding the picture content of the field. A third time constant, which affords an average value over the time period of a number of seconds, enables a thermal reduction.

The method for regulating the picture power in a television receiver is distinguished by the fact that the filtered signal is compared with a desired value, defined beforehand, in order to enable a reduction in the peak white value with variable criteria.

The method for regulating the picture power in a television receiver is furthermore distinguished by the fact that the characterization and the defined values are defined in dependence on the display type and/or on the production criteria and/or on the power circuits and/or on the time ranges.

The method for regulating the picture power in a television receiver is also distinguished by the fact that the time range can be defined from a line period up to the duration of the thermal time constant.

The method for regulating the picture power in a television receiver is furthermore distinguished by the fact that, for plasma displays, there are obtained a fast limitation in dependence on the dynamic configuration of the switched-mode power supply, a second limitation in dependence on the static configuration of the switched-mode power supply and a third limitation in dependence on the display type such as, for example, nature of the glass, cooling means or other characteristic power circuits.

The method for regulating the picture power in a television receiver is additionally distinguished by the fact that small to average white areas can be broadcast with maximum luminance and a luminance reduction commences only from a previously defined size.

The method for regulating the picture power in a television receiver is furthermore distinguished by the fact that, in the case of a picture tube, the fast reduction prevents overloading of the high-voltage generator and slower reduction prevents overloading on a switched-mode power supply and a third limitation is obtained in dependence on the thermal criteria.

The system can also be used in the digital domain in that a converter circuit converts the corresponding digital signals as picture power signal and feeds them to the regulating stages.

BRIEF DESCRIPTION OF THE DRAWINGS

The invention is explained below using a plurality of exemplary embodiments with reference to the drawing, in which:

FIG. 1 shows a television screen, a white WE picture being situated on a black SW background. The white picture excerpt WE of the picture results from H * V in the case of this black and white picture.

FIG. 2 uses a three-dimensional schematic diagram to show how, for example, the peak white values are intended to be varied in dependence on the picture content. In the case of a 50% horizontal and vertical component, for example, a reduction of the maximum peak white value is not desired. For large-area displays, the peak white value is reduced in order to obtain a uniform power consumption. The maximum peak white value is specified here by Cp=1. The surface points A, B, C and D characterize specific points for luminance values in dependence on the horizontal and vertical components of the picture content. This specification is useful in order to define a status, but it does not show the possibilities which are present in order that dynamic screen driving is effected in dependence on the time.

FIG. 3 is useful for showing the regulation for plasma application and illustrates the curves for the video input Vin, moreover the curve for the picture power PI, the voltage VI, the capacitor CS and the voltage Vp, which is also responsible for the regulation of the plasma screen. In the case of the curve profile of the video input Vin, each block that is illustrated corresponds to a field HB and the length is defined by the arrow indicated there. It can also clearly be seen how a change is effected from a black picture content SW to a white picture content WE. The beginning of a full-white picture excerpt WE is identified by the dashed line 1. The regulation is explained later in connection with FIG. 4.

FIG. 4 shows a video processor VP having an input for the luminance signal Y, two inputs for the colour difference signals R-Y, B-Y and a contrast control input CC. The video processor has three outputs for the corresponding R, G, B signals, which are fed to a voltage-current converter CO, on the one hand, and to analog/digital converters, on the other hand. The R, G, B signals are forwarded by the analog/digital converters A/D to the gamma correction a of the respective signal and afterwards pass in each case to the plasma display module PD. The plasma display module PD is supplied with voltage by a power supply unit, in particular a switched-mode power supply SMPS. From the current-voltage converter CO, the signal obtained there for the picture power PI passes in each case to two low-pass filters. One low-pass filter forms a fast loop FL having a time constant of approximately 1 msec. The other low-pass filter forms a slow loop SL having a time constant of approximately 20 msec. The low-pass filter for the fast loop FL is formed by the resistor Rf and the capacitor cf, and the output of the low-pass filter is applied via a resistor R1 to the input of a comparator. The low-pass filter having the slow loop SL is formed by a resistor RS and a capacitor cs, and the output of the low-pass filter is passed via a resistor R2 to the input of the comparator COM. The output of the comparator regulates the current source ir, which serves to discharge a capacitor CS connected in parallel. The voltage across the capacitor CS is designated by VI. The capacitor CS is connected to earth, on the one hand, and to a node K1, on the other hand. The node K1 is connected to the node K2, on the one hand, and, on the other hand, to an output of the interface IF from which a current ic can be fed via a current source. The interface IF receives the input signal from the node K2 and forwards an output signal of the power control PC to the plasma display module PD and another output signal Vref to the comparator COM. The signal from the node K2 is furthermore forwarded to the input of the contrast control CC of the video processor VP. The node K2 is also connected to the current pulse control unit SE, which can charge the capacitor CS by means of current pulses in dependence on the frame flyback FR. The current pulse control unit SE comprises, inter alia, a current source which provides the current it for the charging operation.

The voltage-current converter CO converts the video signals R, G, B into a signal whose profile is equivalent to the instantaneous picture power consumption. This information is reflected at the output PI.

In the following text, it is intended to explain the regulation by means of the fast loop FL.

Figure 1:
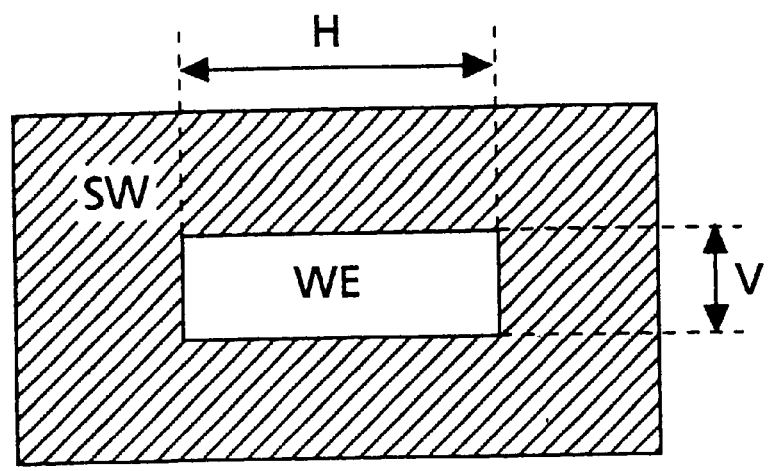
FIG. 1 shows a screen.
Figure 2:
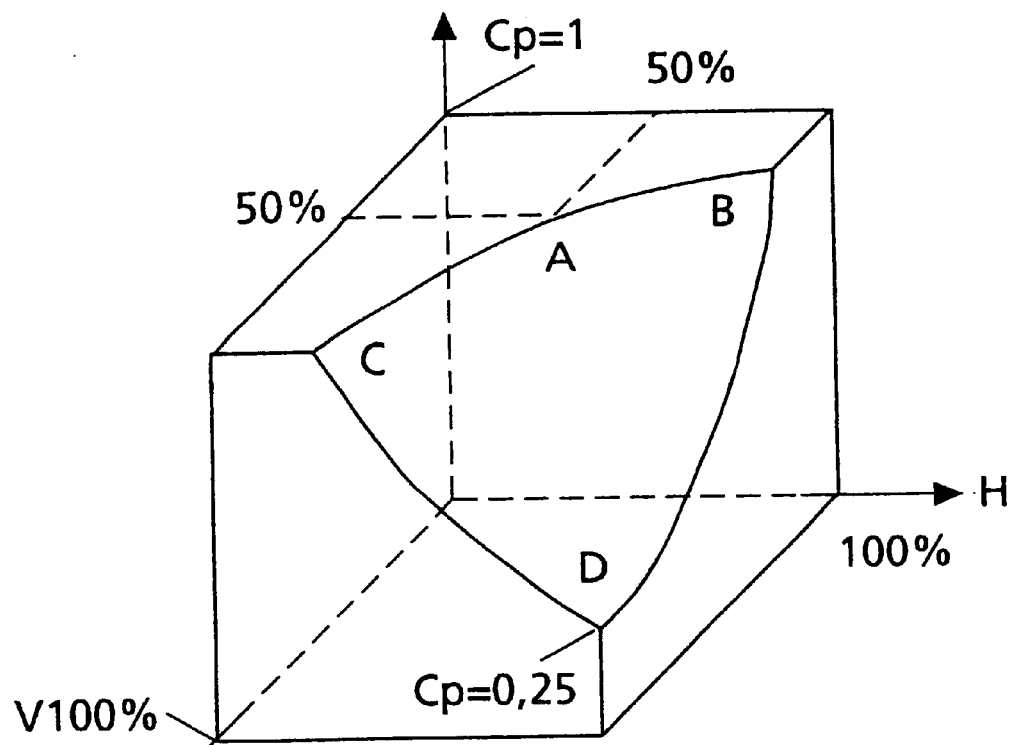
FIG. 2 shows a diagrammatic illustration of the luminance values for different picture contents.
Figure 3:
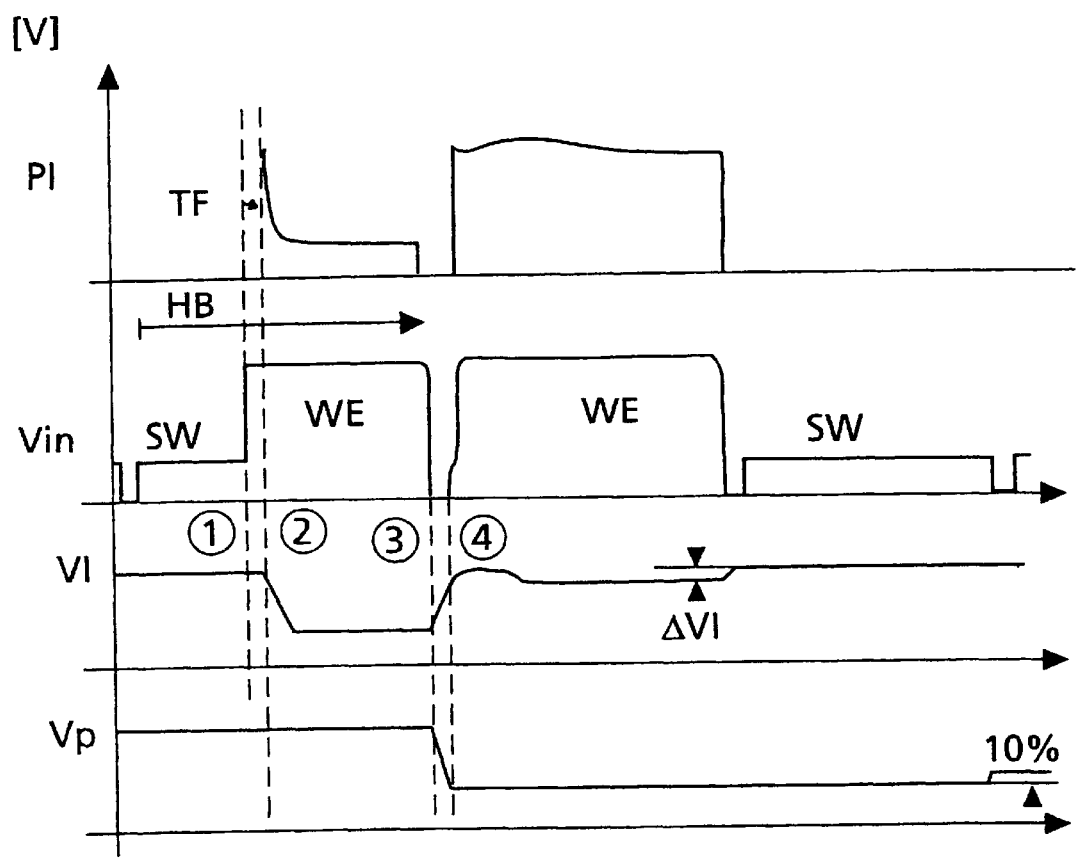
FIG. 3 shows critical video sequences for plasma application.
Figure 4:
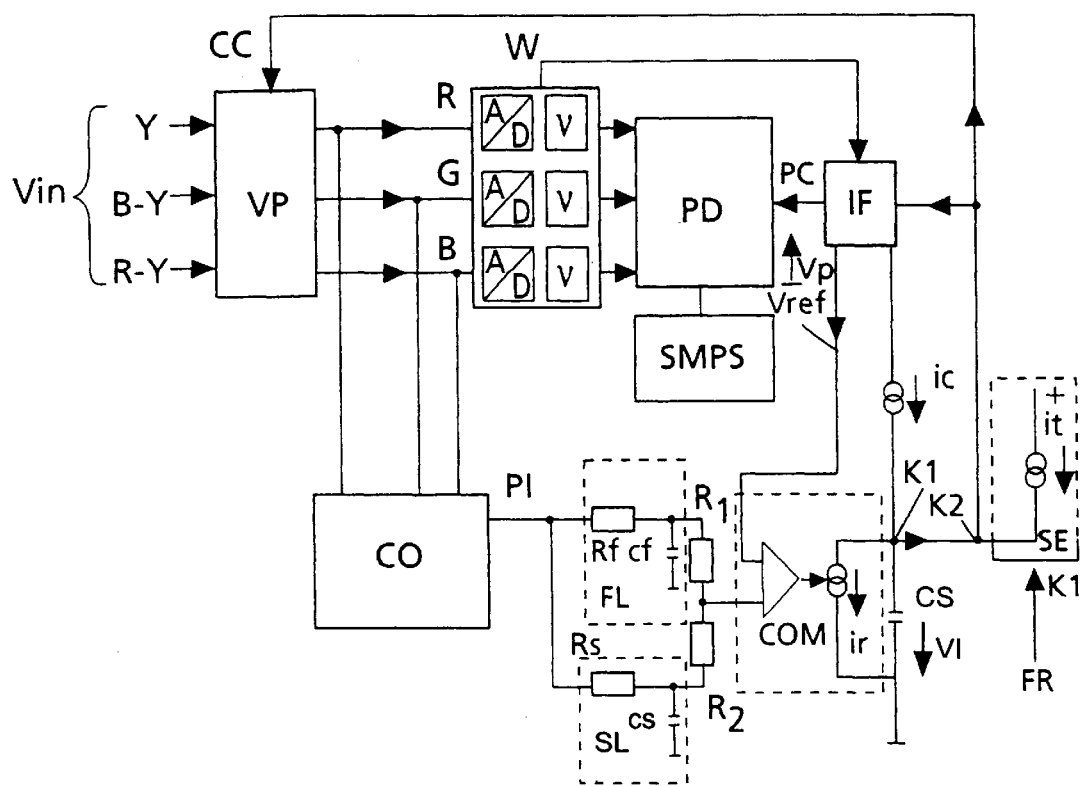
FIG. 4 shows a blocked diagram for the realization of the regulation with a plasma screen.

For this purpose, the curve profile of FIG. 3 is enlisted for assistance. The video input signal Vin has a black picture content SW until the instant 1. The curve for the picture power PI shows no alteration and the voltage VI across the capacitor CS is at a maximum, with the result that the contrast control input CC does not have to be activated in the video processor VP. From the instant 1, it can be seen from the video input signal Vn that a change has taken place from the black line SW to white lines WE. For the time interval between the instants 1 and 2, the system does not yet down-regulate the picture power, in order to give the impression of a maximum-white picture content for small areas. From the instant 2, the fast loop FL is deployed and down-regulates the voltage VI across the capacitor CS, so that the maximum power of the switched-mode power supply SMPS is not exceeded. The regulation deliberately did not commence until after a few lines, because if the picture content had changed within these lines, down-regulation would not have been necessary. On account of the continuous signal for the white picture content, the regulation is then effected, however. The viewer will not excellently perceive this as such, since from now on the white fields are always shown with the same white value.

In other words the value PI rises starting from 1. This rise is forwarded via the fast loop FL, with defined timing, to the comparator COM. The time constant is critical in respect of how long an elevated value PI (elevated picture power) is permitted to be maintained. The fast loop has, for example, a time constant (determined by Rf and cf) of a few milliseconds. If an excessively high value is then still present, the voltage across the capacitor cf and, consequently, at the input of the comparator COM rises. The comparator COM becomes active and permits a higher current flow of ir, with the result that the capacitor CS is discharged and, at the same time, the voltage at the contrast control input CC of the video processor VP decreases. As a result of the decrease in the voltage at the contrast control input CC, the video processor reduces its output signals R, G, B proportionally in terms of their value. This regulation is maintained until the instant 3, when the voltage Vp decreases. The voltage Vp is present at the input Power Control PC and is also responsible for the regulation of the plasma screen. By virtue of the decrease in the voltage Vp, the picture power is reduced and, consequently, it is possible for the voltage VI to rise again effected by IF and ic across the capacitor CS.

If the voltage VI across the capacitor CS rises, this rise is noticed at the contrast control input CC and the video processor VP elevates the value of the R, G, B signals and, consequently, the regulating circuit is closed. That is to say that the regulated variable passes to the contrast control input CC of the video processor via the voltage-current converter CO, the fast and slow loops FL, SL, the comparator COM, via the capacitor CS. Starting from the instant 4, the regulation then operates with a low voltage Vp and the maximum value of PI. The charge of the capacitor CS can be influenced either by the voltage VREF and/or by the current source IC.

Figure 5:
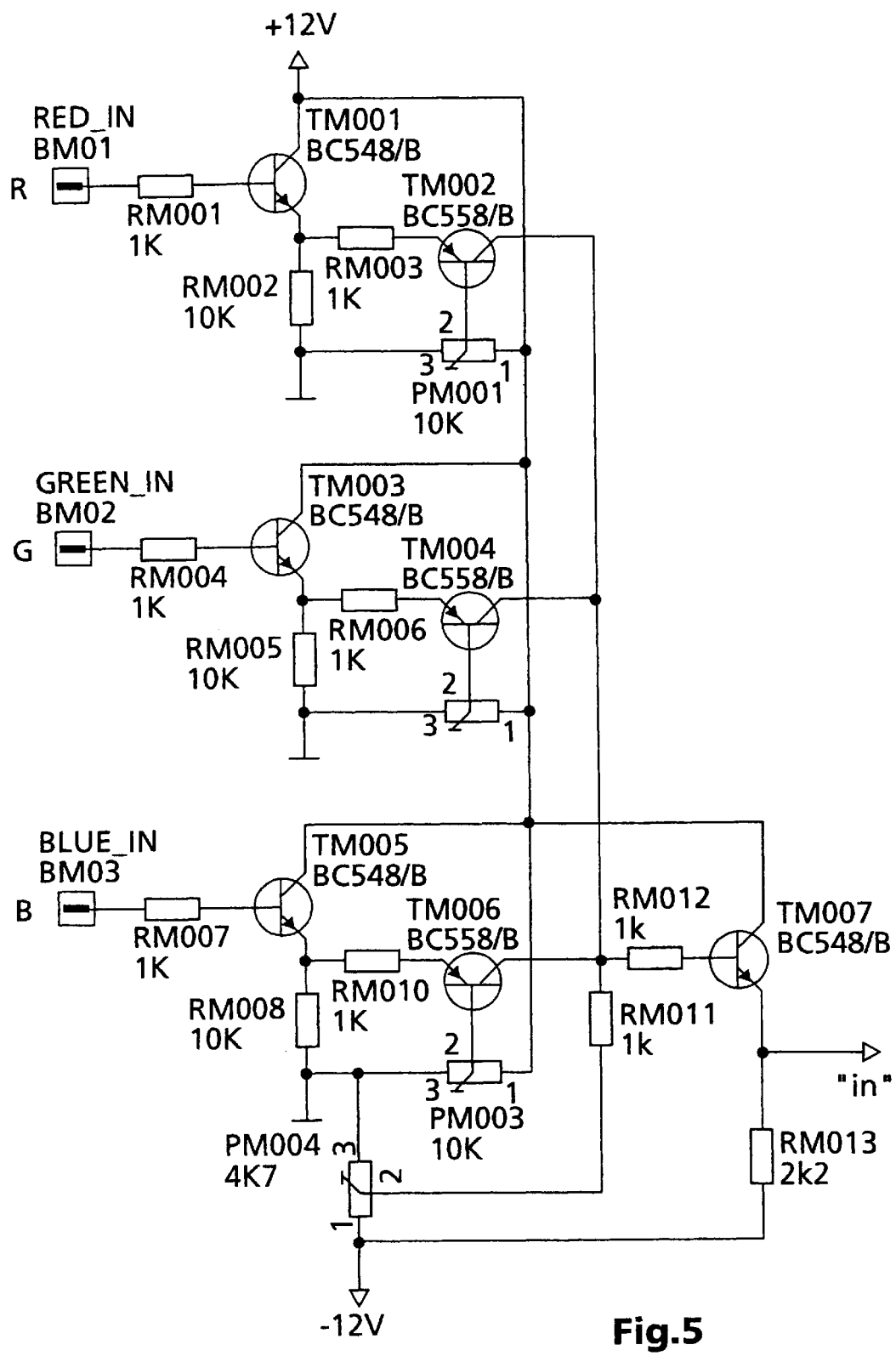
FIG. 5 shows an exemplary embodiment of a circuit for the voltage-current converter.

FIG. 5 shows a circuit which is how the multi-current converter with gamma function is constructed. The R, G, B signals are fed to the bases of the transistors TM001, 3 and 5. The transistors amplify the R. G. B signal. The transistors TM002, 4, 6, which operate as adjustable diode, are connected in a common-base circuit to the emitters of the transistors TM001, 3, 5. The collectors of the transistors TM002, 4, 6 are connected to one another, thus form a summation signal and drive the base of the transistor TM007. The collectors of the transistors TM001, 3, 5 are likewise connected to one another and are connected to the collector of the transistor TM007. The picture power signal PI is obtained downstream of the emitter of the transistor TM007. The transistor TM007 produces a voltage value for the signal PI.

Figure 6:
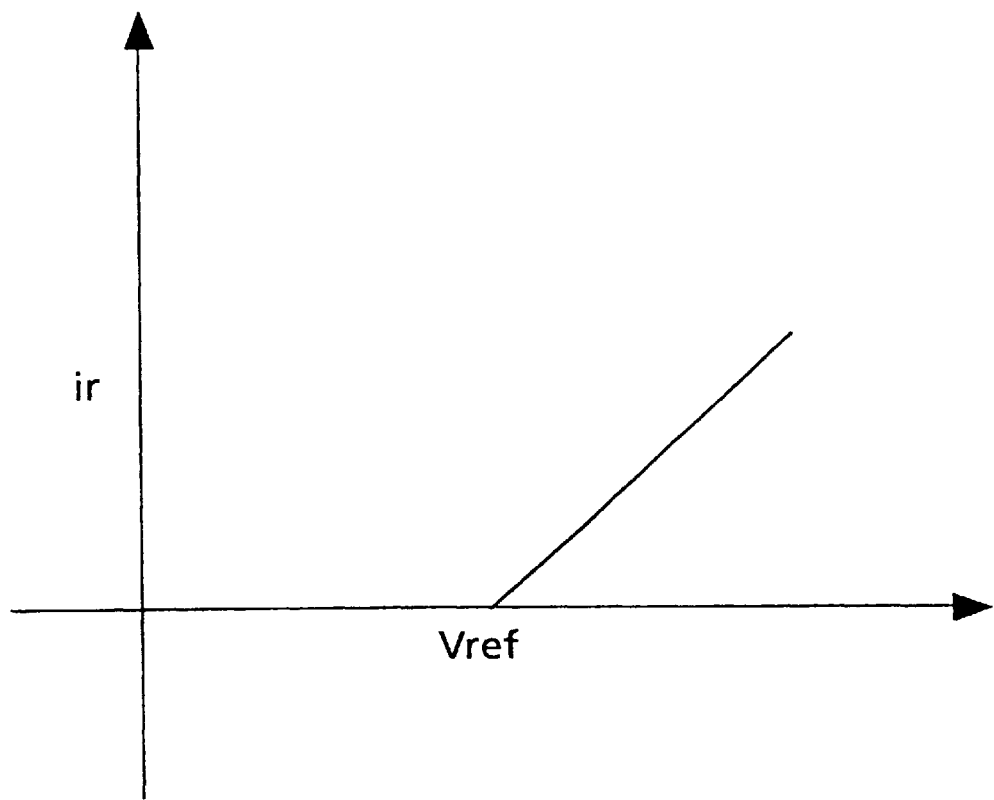
FIG. 6 shows the voltage profile vref.

FIG. 6 shows how the voltage vref rises as a function of ir. The reduction in the vref level discharges the capacitor CS with the current source ir to a lesser extent, whereby the voltage across CS, effected by ic, rises to the maximum permissible value.

Figure 7:
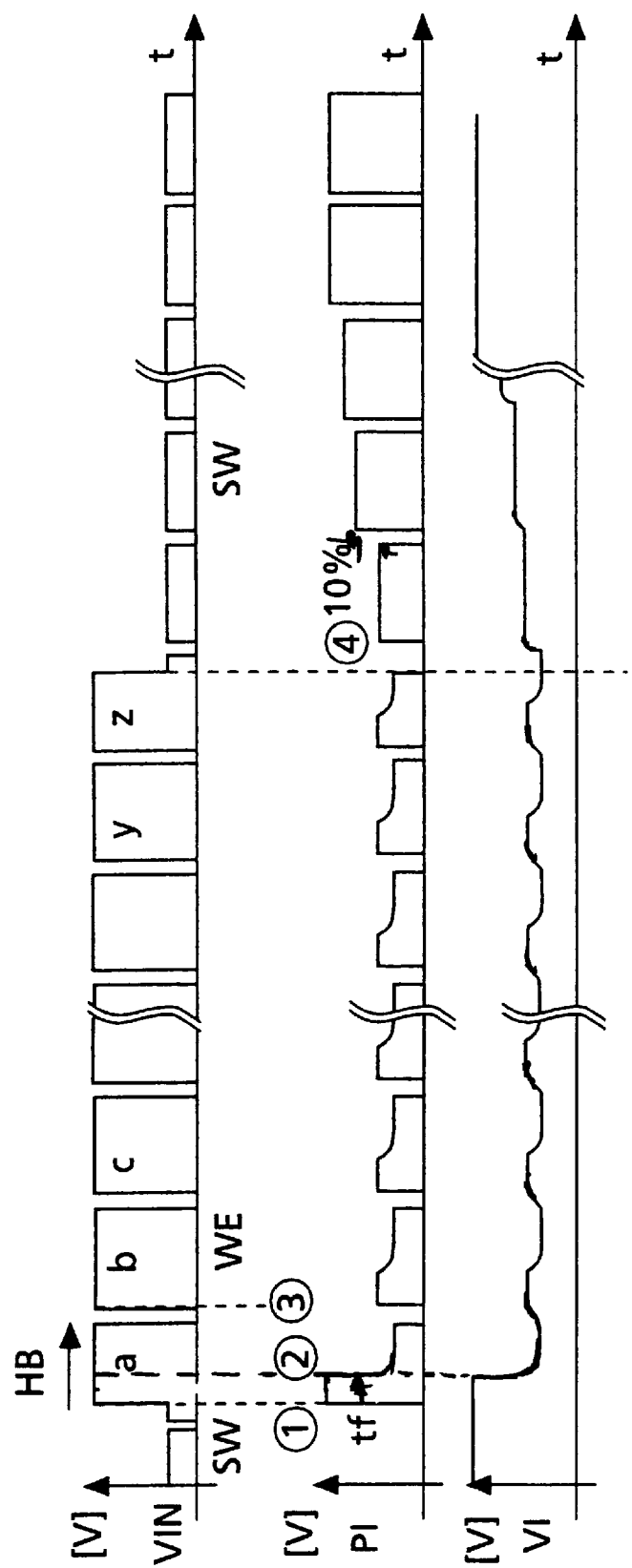
FIG. 7 shows critical video sequences for CRT application.

FIG. 7 is useful for showing the regulation for a picture tube and illustrates, moreover, the curves for the video input Vn, moreover the curve for the picture power PI and the voltage VI across the capacitor CS. In the curve profile of the video input Vn, each block that is illustrated corresponds to a field HB and the length is defined by the arrow indicated there. It can also clearly be seen how a change is effected from a black SW picture content to a white WE picture content. The beginning of a full-white WE and of a full-black SW is in each case identified by the dashed lines. The regulation is explained in connection with FIG. 8.

Figure 8:
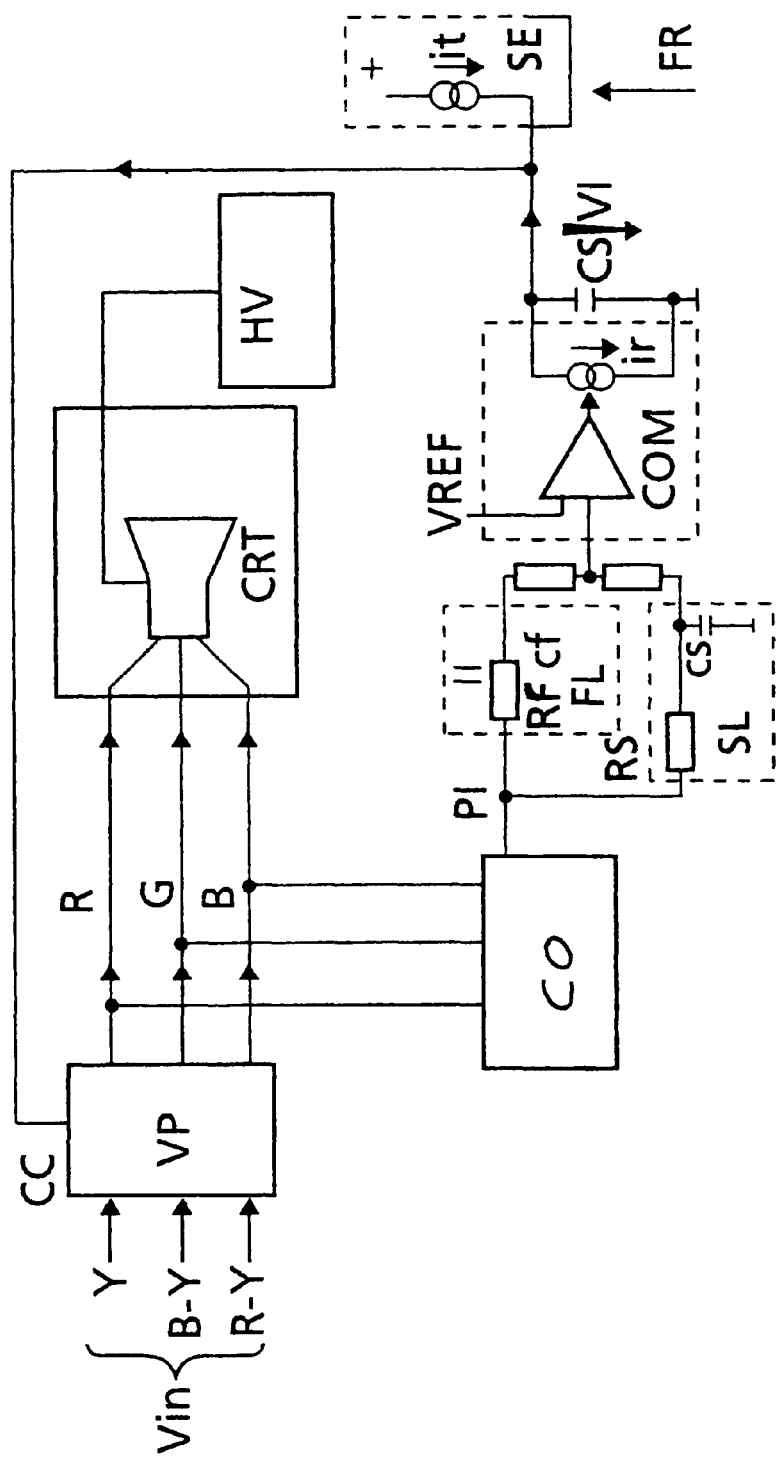
FIG. 8 shows a blocked diagram with regulation for a picture tube.

FIG. 8 shows a video processor VP having an input for the luminance signal Y, two inputs for the colour difference signals R-Y, B-Y and a contrast control input CC. The video processor has three outputs for the corresponding R, G, B signals, which are fed to a voltage-current converter CO, on the one hand, and to the picture tube CRT for the purpose of driving it. A high-voltage generator HV is provided for the voltage supply of the picture tube CRT.

From the current-voltage converter CO, the signal which is obtained there and gamma-corrected for the picture power PI passes in each case to two low-pass filters. A low-pass filter forms a fast loop FL having a time constant of approximately 1 msec. The other low-pass filter forms a slow loop SL having a time constant of approximately 20 msec. The low-pass filter for the fast loop FL is formed by the resistor Rf and the capacitor cf, and the output of the low-pass filter is applied via a resistor R1 to the input of a comparator. The low-pass filter having the slow loop SL is formed by a resistor RS and a capacitor cs, and the output from the low-pass filter is passed by a resistor R2 to the input of the comparator COM. The output of the comparator regulates the current source ir, which serves to discharge a capacitor CS connected in parallel. The voltage across the capacitor CS is designated by VI. The capacitor CS is connected to earth, on the one hand, and, on the other hand, to the input of the contrast control CC of the video processor VP and, furthermore, to the current pulse control unit SE. In dependence on the frame flyback FR, the current pulse control unit SE charges the capacitor CS by means of current pulses. The current pulse control unit SE comprises, inter alia, a current source which provides the current it for the charging operation.

The voltage-current converter CO converts the video signals R, G, B into a signal whose profile is equivalent to the instantaneous picture power consumption. This information is reflected at the output PI.

In the following text, it is intended to explain the regulation by means of the fast loop FL.

For this purpose, the curve profile of FIG. 7 is enlisted for assistance. The video input signal Vin has a black picture content SW until the instant 1. The curve for the picture power PI shows no alteration and the voltage VI across the capacitor CS is maximal, with the result that the contrast control input does not have to be activated in the video processor VP. From the instant 1, it can be seen from the video input signal Vin that a change has taken place from the black line SW to white lines WE. For the time interval between the instants 1 and 2, the system does not yet down-regulate the picture power, in order to give the impression of a maximum-white picture content for small areas. From the instant 2, the fast loop FL is deployed and down-regulates the voltage VI across the capacitor CS, so that the maximum power of the HV is not exceeded. The regulation deliberately did not commence until after a few lines, because if the picture content had changed within these lines, down-regulation would not have been necessary. On account of the continuous signal for the white picture content, the regulation is then effected, however. The viewer will not excellently perceive this as such, since from now on the white fields are always shown with the same white value.

In other words assuming we have a full-white picture, the value PI rises. This rise is forwarded via the fast loop FL, with defined timing, to the comparator COM. The time constant is critical in respect of how long an elevated value PI (elevated picture power) is permitted to be maintained. The fast loop has, for example, a time constant (determined by rf and cf) of between 0.3 and 1 msec. If an excessively high value is then still present, the voltage across the capacitor cf and, consequently, at the input of the comparator COM rises. The comparator COM becomes active and permits a higher current flow of ir, with the result that the capacitor CS is discharged and, at the same time, the voltage at the contrast control input of the video processor decreases. As a result of the decrease in the voltage at the contrast control input, the video processor reduces its output signals R, G, B proportionally in terms of their value. This regulation is maintained until the instant 4, when, as a result of the change from a white WE picture content to a black SW picture content, the picture power has been decreased and, consequently, it is possible for the voltage VI across the capacitor CS to rise again. This rise is ensured by virtue of the fact that after each field, a small charging current it flows into CS, which current increases the voltage value across CS and, consequently, at CC by a maximum of 10%. The slow regulation by way of rs and cs operates in the same way but has a significantly slower time constant.

If the voltage VI across the capacitor CS rises, this rise is noticed at the contrast control input CC and the video processor VP elevates the value of the R, G, B signals and, consequently, the regulating circuit is closed. That is to say that the regulated variable passes to the contrast control input CC of the video processor via the voltage-current converter CO, the fast and slow loops FL, SL, the comparator COM, via the capacitor CS.

Figure 9:
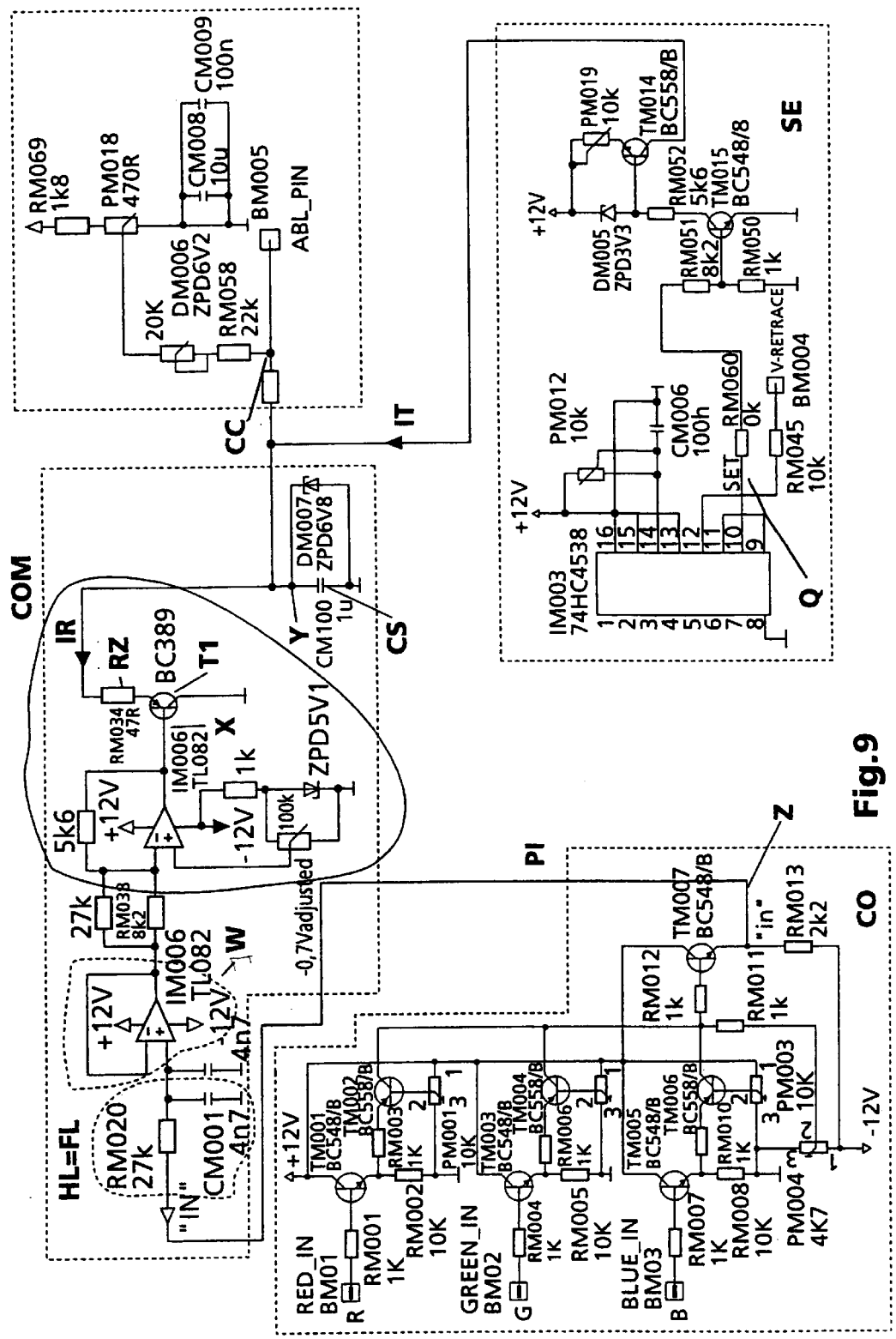
FIG. 9 shows a circuit diagram with a fast loop, FIG. 9.1 shows the luminance behaviour of the fast loop, FIG. 9.2 shows dynamic regulation (WE→SW), FIG. 9.3 shows dynamic regulation (SW→WE)

FIG. 9 shows a circuit diagram with a fast loop. Identical designations indicate the same method of operation. The signal passes from the voltage-current converter CO to the fast loop FL, and from there via an impedance converter IW to the comparator COM, at whose output the capacitor CS is arranged, and the signal is forwarded to the video processor pin CC. The current pulse control unit SE serves, inter alia, to charge the capacitor CS with the current IT.

FIG. 9.1 illustrates the luminance response. The luminance L is illustrated as a function of the horizontal component H and vertical component V. It is evident that given a horizontal component of 40%, a reduction in the luminance is not performed, but from 40% a reduction in the luminance is performed. It can be seen in the vertical direction that as good as no regulation is effected. FIG. 9.1 illustrates a static regulating response. Regulation is performed only in the horizontal direction. Consequently, the respective lines are monitored.

Figure 10:
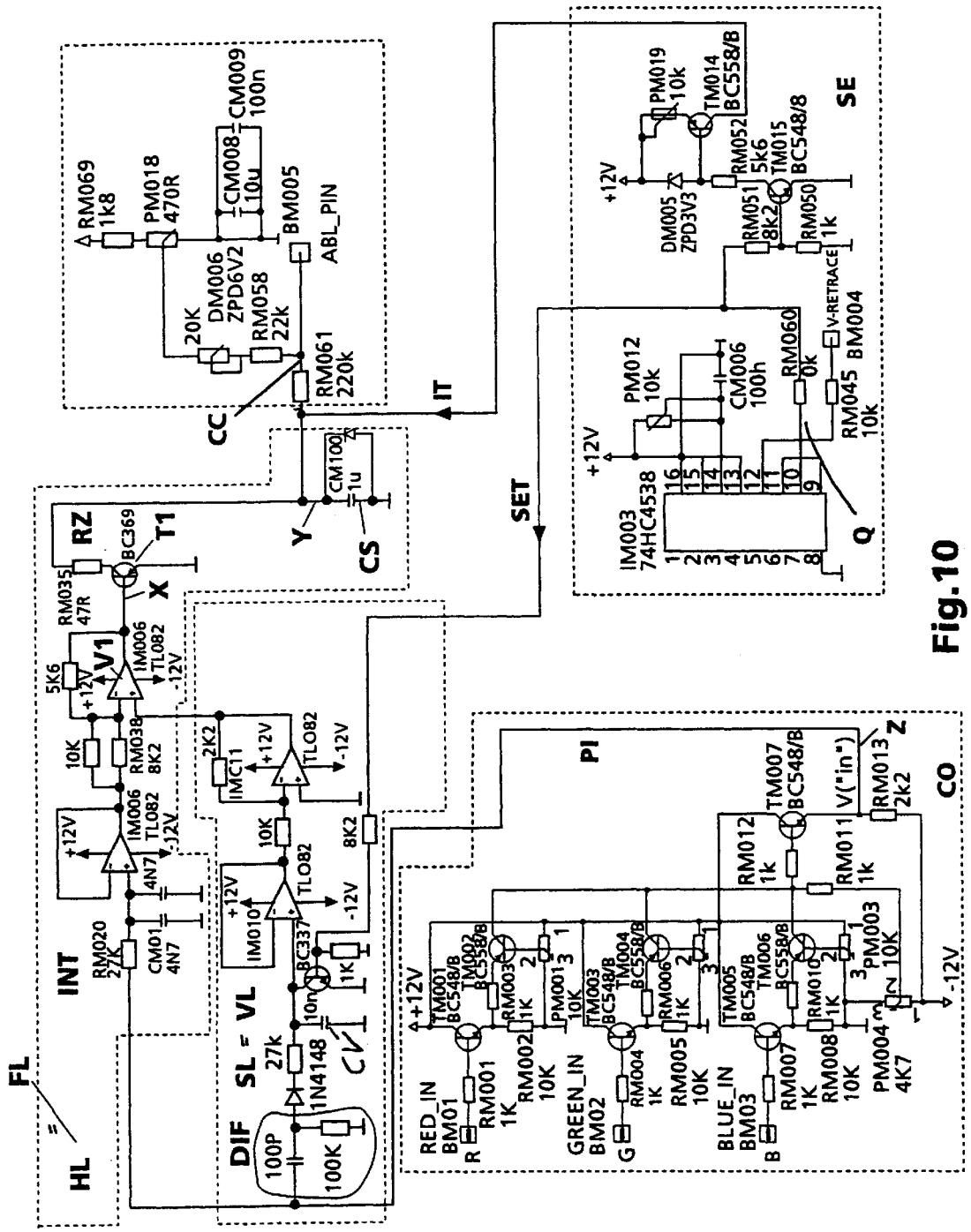
FIG. 10 shows a circuit diagram with two loops, FIG. 10.1 shows the luminance behaviour.
Figure 11:
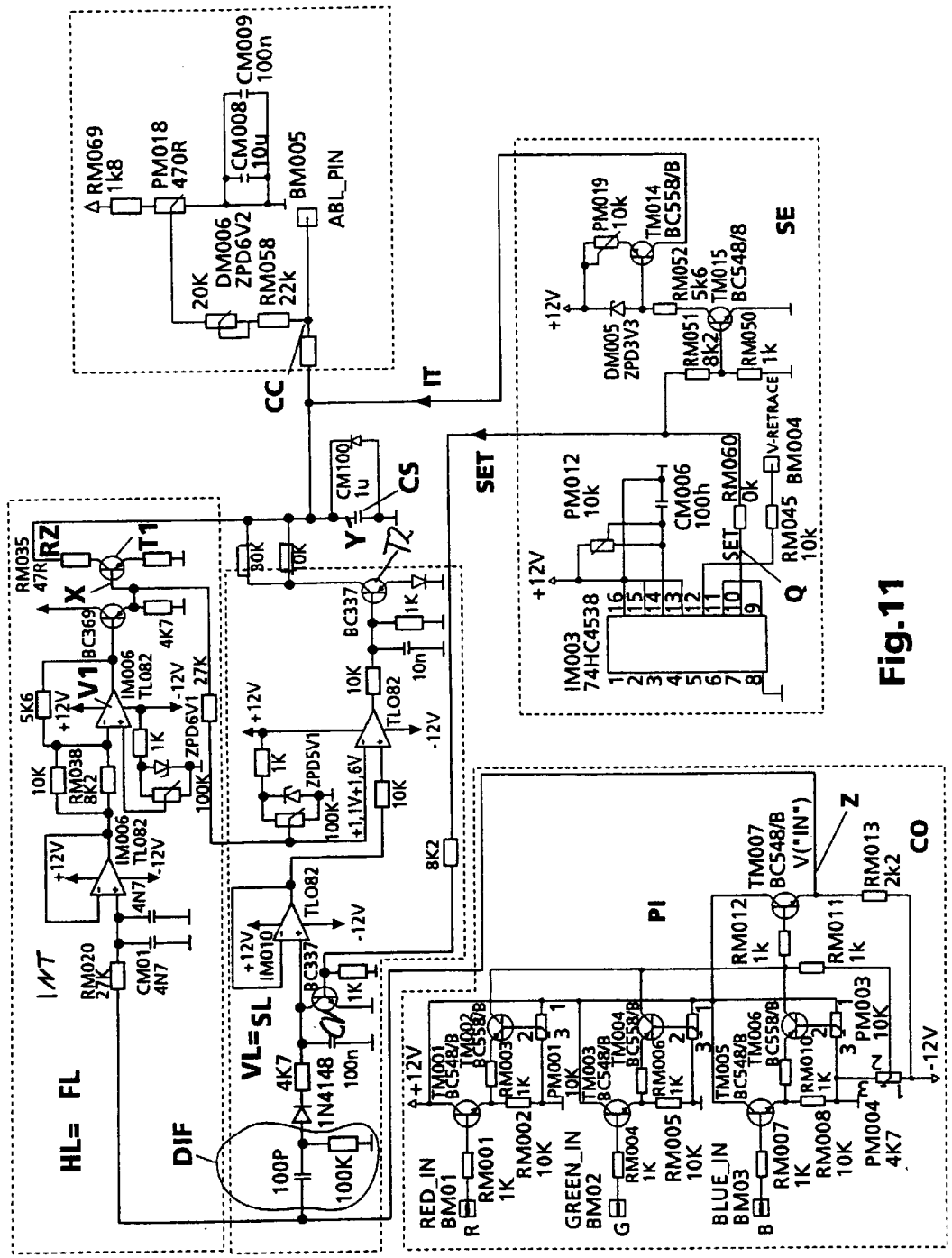
FIG. 11 shows a further circuit diagram with two loops, and FIG. 11.1 shows the luminance behaviour.

FIGS. 9.2 and 9.3 illustrate the dynamic regulating response for FIG. 9, FIG. 10 and FIG. 11. The dynamic regulating response is always the same because the dynamic regulating response relates to the fast regulation. FIG. 9.2 illustrates a regulation from a full-black picture to a full-white picture. The measurement points X, Y, Z and Q are identified in FIG. 9. FIGS. 9.2 and 9.3 illustrate the curve profiles therefor. The curve profile of the value Z corresponds to the value of the picture power PI. The peaks in between correspond to the line flyback. The value Y is the voltage value of the capacitor CS. The curve X shows the voltage value of the base of the transistor T1. It is possible to use the resistor RZ to set the time constant for the discharge of the capacitor CS. FIG. 9.2 illustrates the fast time constant of the fast loop with TS=300 is. This time constant applies to the reduction in the picture power.

FIG. 9.3 illustrates the transition from a full-white to a full-black picture. It can be seen that only the current pulse control unit SE is active. In each field, a small current pulse is passed into the capacitor CS. The current IT is caused by the signal Q. The capacitor CS is charged in approximately 10% steps. In the normal case, approximately 6 volts are present on the pin CC of the video processor. If 5.5 volts are assumed, a minimum luminance may be mentioned, with the result that the voltage is raised by the capacitor CS from 5.5 volts to 6 volts. The current pulse, as illustrated there, is only briefly present during the flyback time. FIG. 9.3 illustrates the time constant which is used in order to increase the picture power again TA=70 ms.

FIG. 10 shows a circuit diagram with two loops. The fast loop FL and the slow loop SL are illustrated. FIG. 10.1 shows that regulation is achieved both in the vertical and in the horizontal direction. In FIG. 10.1, a maximum luminance is permitted up to 30% horizontal and 30% vertical. In FIG. 10, the loop for the vertical component is designed as a differentiator and the loop for the horizontal component is designed as an integrator. Both signals then arrive at the amplifier V1 and since both signals are then used, in contrast to FIG. 9 the vertical is influenced, as illustrated in FIG. 10.1. The set signal SET ensures that a signal is present in each case for a field. The set signal sets the value of the vertical component to zero after each field. The static regulation in FIGS. 10.1 and 11.1 is performed in the horizontal and vertical directions, with the result that the lines can be regulated as an area.

FIG. 11 shows a further refinement, which once again illustrates a loop for the horizontal and vertical components. In this case, the capacitor CS is correspondingly discharged by both loops. It can clearly be seen in FIG. 11.1 that the luminance does not change in the values from 0 to 50% in the horizontal and vertical directions. As soon as this value is exceeded, the regulation commences and the luminance is limited. It can be seen in FIGS. 10 and 11 that the horizontal loop constitutes the fast loop FL and the vertical loop constitutes the slow loop SL. In FIG. 11, in contrast to FIG. 10, transistor T2 is additionally used for discharging CS. Furthermore, the improved response is achieved by a faster time constant for the vertical direction.

What is claimed is:

1. Method for regulating the picture power in a television receiver comprising the steps of:
    forming a picture power representative signal from video signals coupled for display:
    generating a control signal by comparing said picture power representative signal with a predetermined value;
    displaying said video signals with a plasma display having power dissipation controlled in accordance with said control signal.

2. Method according to claim 1, wherein said forming step comprises the step of;
    filtering said picture power representative signal with a tow pass.

3. Method according to claim 2, wherein said filtering step comprises the step of;
    filtering with a short time constant and down regulating in accordance with said picture power representative signal having a maximum power and a short duration.

4. Method according to claim 2, wherein said filtering step comprises the step of;
    filtering with a long time constant and down regulating in accordance with a thermal criteria.

5. Method according to claim 1, wherein said forming step comprises;
    defining an area of white having a maximum luminance value in said video signals coupled for display and rapidly reducing said maximum luminance value for areas exceeding said area.

6. Method according to claim 1, wherein said controlling step comprises, reducing video signal amplitude rapidly during multiple line periods and increasing video signal amplitude during multiple field periods.

7. Method according to claim 1, wherein said generating step comprises;
    setting said predetermined value in accordance with one of a manufacturing value and a user determined value.

8. Method according to claim 2, wherein said filtering step comprises the step of;

low pass filtering with filters of differing frequencies.

9. Method according to claim 1, wherein said displaying step comprises the step of;

controlling said video signals coupled for display in accordance with said control signal.

10. Method according to claim 2, wherein said filtering step comprises the step of;

filtering with a long time constant and down regulating in accordance with said picture power representative signal having a maximum power for a long duration.

11. A television receiver with power regulation comprising:

a video processor receiving video signals and controllably generating output video signals;

a plasma display coupled to display said controllably generated output video signals;

an interface responsive to a control signal for controlling power dissipation in said plasma display;

a converter circuit coupled to said controllably generated output video signals and generating therefrom a picture power representative signal, and;

a comparator circuit receiving said picture power representative signal and a reference signal for generating said control signal for said interface in accordance with said controllably generated output video signals.

12. Circuit according to claim 11, wherein said video processor has three output signals and these signals are converted into said picture power representative signal by the converter circuit.

13. Circuit according to claim 11, wherein a fast regulation loop cooperates with said interface for plasma regulation.

14. Circuit according to claim 11, wherein said comparator circuit is coupled to a control unit for filtering said picture power representative signal in accordance with a first and a second time constant.

15. Circuit according to claim 11, wherein said control signal is coupled to said video processor to control an amplitude of said output video signals.

* * * * *